US006471231B1

United States Patent
Hargroder

(10) Patent No.: US 6,471,231 B1
(45) Date of Patent: Oct. 29, 2002

(54) ELECTRIC BRAKE SYSTEM FOR MANUAL WHEELCHAIRS

(76) Inventor: Todd L. Hargroder, 15135 Oak Briar, San Antonio, TX (US) 78232

( * ) Notice: Subject to any disclaimer, the term of this patent is extended or adjusted under 35 U.S.C. 154(b) by 17 days.

(21) Appl. No.: 09/921,498

(22) Filed: Aug. 3, 2001

(51) Int. Cl.[7] .................................................. B60T 1/00
(52) U.S. Cl. ............................... 280/304.1; 280/250.1; 188/2 F
(58) Field of Search ............................. 188/2 F, 24.16, 188/24.18, 158, 24.14, 31, 60; 280/250.1, 304.1, 47.38

(56) References Cited

U.S. PATENT DOCUMENTS

| | | | | |
|---|---|---|---|---|
| 4,407,393 A | * | 10/1983 | Youdin et al. ............... | 188/2 F |
| 4,805,711 A | * | 2/1989 | Lautzenhiser .............. | 180/65.1 |
| 5,125,468 A | * | 6/1992 | Coker ........................ | 180/13 |
| 5,358,266 A | * | 10/1994 | Roth et al. ................ | 280/304.1 |
| 5,669,619 A | * | 9/1997 | Kim ......................... | 280/250.1 |
| 5,927,414 A | * | 7/1999 | Kan et al. .................. | 180/19.3 |
| 6,264,007 B1 | * | 7/2001 | Norton et al. .............. | 188/2 F |

* cited by examiner

Primary Examiner—Avraham H. Lerner
(74) Attorney, Agent, or Firm—Gunn, Lee & Hanor, P.C.

(57) ABSTRACT

An electrical braking system is shown for a lightweight manual wheelchair. A rechargeable battery source on the wheelchair connects through a switch to a linear actuator for operation of an actuator rod. The actuator rod connects through a pulley to a single braking cable that connects to left and right caliper brakes mounted on the left and right wheels. Moving the center OFF switch a first direction will move the actuator rod, pull the braking cable, and apply both brakes. Moving the center OFF switch a second direction will move the actuator rod the opposite direction which releases the braking cable and hence the brakes. As soon as the switch returns to OFF, the linear actuator maintains the same amount of braking pressure, if any. A limit switch prevents too much braking pressure from being applied and protects the linear actuator.

21 Claims, 7 Drawing Sheets

ELECTRIC BRAKE SYSTEM FOR MANUAL WHEELCHAIRS

BACKGROUND OF THE INVENTION

1. Field of the Invention

The present invention relates generally to the field of wheelchairs and, more specifically, to an electrical braking system for manual wheelchairs.

2. Background Information

Numerous types of braking mechanisms for manual wheelchairs are known in the art. The most typical manual wheelchair brake is a manual "over center" locking device which is activated by a lever arm and, when forced into its locking position, presses a braking member against the surface of the wheelchair tire creating a frictional braking action. Several factors mitigate against the usefulness and reliability of these types of brakes. Loss of tire pressure reduces the frictional force exerted by the crossbar on the tire and hence reduces the braking effect. A significant air pressure loss leaves these brakes useless. During transfer in and out of the chair, this type of brake allows the tire to slide underneath the crossbar and the wheelchair to move. Similarly, the brakes are ineffective and will not adequately hold the wheelchair on an incline. Other types of manual brakes include caliper type brakes manually activated with a lever arm mounted to a cable and brake assembly causing brake pads to press against the rim of the wheelchair wheel.

In these types of brakes, the frictional braking force exerted is directly related to the manual force which must be exerted on the lever arm by the brake operator to activate the brake. Wheelchair users who have arm or hand limitations may not be physically able to operate these brakes. These braking mechanisms only apply a braking force to one wheel. If an equal braking force is desired on both wheels, the user is required to use both arms and attempt to apply an equal force to both lever arms at the same time. This is difficult, if not impossible. Wheelchair frame and wheel design most often require the placement of the lever arms on the frame of the wheelchair near the user's knees. The placement of these lever arms interferes with the user's transfer in and out of the wheelchair. These lever arms require lifting the user's body in order to clear the lever during transfer.

A patent to Ross and Gunther, U.S. Pat. No. 5,358,266 describes a plate attached to a braking member which applies a braking frictional force to the wheelchair tire when electronically activated by a solenoid rod. The solenoid rod is activated by means of a switch attached to the seat of the wheelchair. When the wheelchair user is raised out of the seat, the switch is activated and operates the braking mechanism. Also disclosed in this patent is a manually activated lever arm to operate the same braking member when the wheelchair user is seated. The same deficiencies discussed above apply to this wheelchair while the wheelchair user is seated. A wheelchair user with arm or hand limitations may not be able to operate the hand lever and the lever arm braking mechanism to apply a braking force to one wheel. In addition, the position of the lever arm may interfere with transfer in and out of the wheelchair.

Electric wheelchairs with various forms of braking means are common in the prior art. These braking means include gear reduction mechanisms, electromagnetic braking by means of a resistance applied to the electric motors, electronically activated frictional braking mechanisms where a solenoid is electrically energized to move brake shoes into frictional contact with a brake drum, and conventional manual brakes operated by a lever mechanism. These electric wheelchairs are heavy, cumbersome, difficult to transport and do not promote physical activity by user.

It is desirable to have a lightweight, manual wheelchair with an effective easily operable electronic braking mechanism.

SUMMARY OF THE INVENTION

It is an object of this invention to provide an electronically activated braking system for a lightweight, manual wheelchair which allows the wheelchair to maintain its lightweight and maneuverability characteristics.

It is a further object of this invention to have an electronically activated braking system for manual wheelchairs which eliminates the need for users of the wheelchair to manually operate brakes by means of a lever mechanism.

It is a further object of this invention to provide a braking system for manual wheelchairs which provides equal braking force to both wheels of a wheelchair simultaneously.

It is a further object of this invention to provide a braking means for a manual wheelchair which can be activated without the use of a manually operated lever which interferes with transfer in and out of the wheelchair by the user.

It is a further object of this invention to provide a braking means for manual wheelchairs which eliminates movement of the wheelchairs on inclines and during transfer in and out of the wheelchair by the user.

It is a further objection of this invention to provide a braking means for manual wheelchairs which allows for detaching the wheelchair wheels without disturbing the braking means.

In order to achieve these objectives, this invention provides for an electronic braking system, which is comprised of a braking means, a cable pulley system for activating the braking means, a DC liner actuator with actuator rod connected to the cable pulley system, a motion limit switch, a rechargeable twelve-volt battery electronically connected to the DC actuator, and a double throw control switch electronically connected to the battery for activating the battery power.

It is anticipated that the preferred braking means is a caliper-type brake positioned to clamp onto a metal disk mounted axially to a hub which rotates on the axil of each wheelchair wheel. The hub on which the disk is mounted mates in gear fashion with the hub on the wheelchair wheel. The mating hubs are locked together with a locking pin which extends axially through the center of the mated hubs such that the hubs are locked and rotate together when the wheelchair wheel is turned.

The braking means for each wheel are connected to opposite ends of a cable wire. The cable wire passes around a pulley such that displacement of the pulley provides equal force and displacement to said opposite ends of the cable wire. The ends of the cable wire are directed through small openings in a mounting bracket. The openings are spaced a distance equal to the diameter of the pulley so the cable wire remains parallel as it extends from the pulley through said openings. A circular pulley cap is placed concentrically over the pulley. The vertical side of the pulley cap has two openings to allow for the passage of the wire cable into the pulley cap through the first opening, around the pulley and out the second opening. The pulley cap, pulley, and cable wire assembly is then connected to the outer end of the actuator rod by a coupling bracket.

The DC linear actuator is mounted on the wheelchair in a manner to allow the actuator rod to extend and displace the pulley and cable wire in line with the actuator rod's axis. The DC linear actuator is electronically powered by a twelve-volt rechargeable battery mounted to the wheelchair. The battery power is activated by a double throw control switch mounted to the wheelchair in a position where it is easily accessed by both the wheelchair user and a person assisting the wheelchair user.

The double throw toggle switch can be thrown in two different directions. When the double throw toggle switch is thrown in the first direction, it will cause the actuator rod to retract, pulling the pulley and cable wires and activating the braking force. When the toggle switch is thrown in the second direction, it will cause the actuator rod to extend, pushing the pulley and cable wire and deactivating the braking force.

In order to limit the tension in the cable wire, a motion limit switch can be added to the electrical brake system. The motion limit switch is wired into the circuit between the double throw toggle switch and said DC linear actuator. The motion limit switch is activated by displacement of the actuator rod in the direction which pulls the cable wire and activates the braking means. Once a selected braking force is attained, the motion limit switch opens the circuit and stops the displacement of the actuator rod.

DETAILED DESCRIPTION OF THE PREFERRED EMBODIMENT

Figure 1:
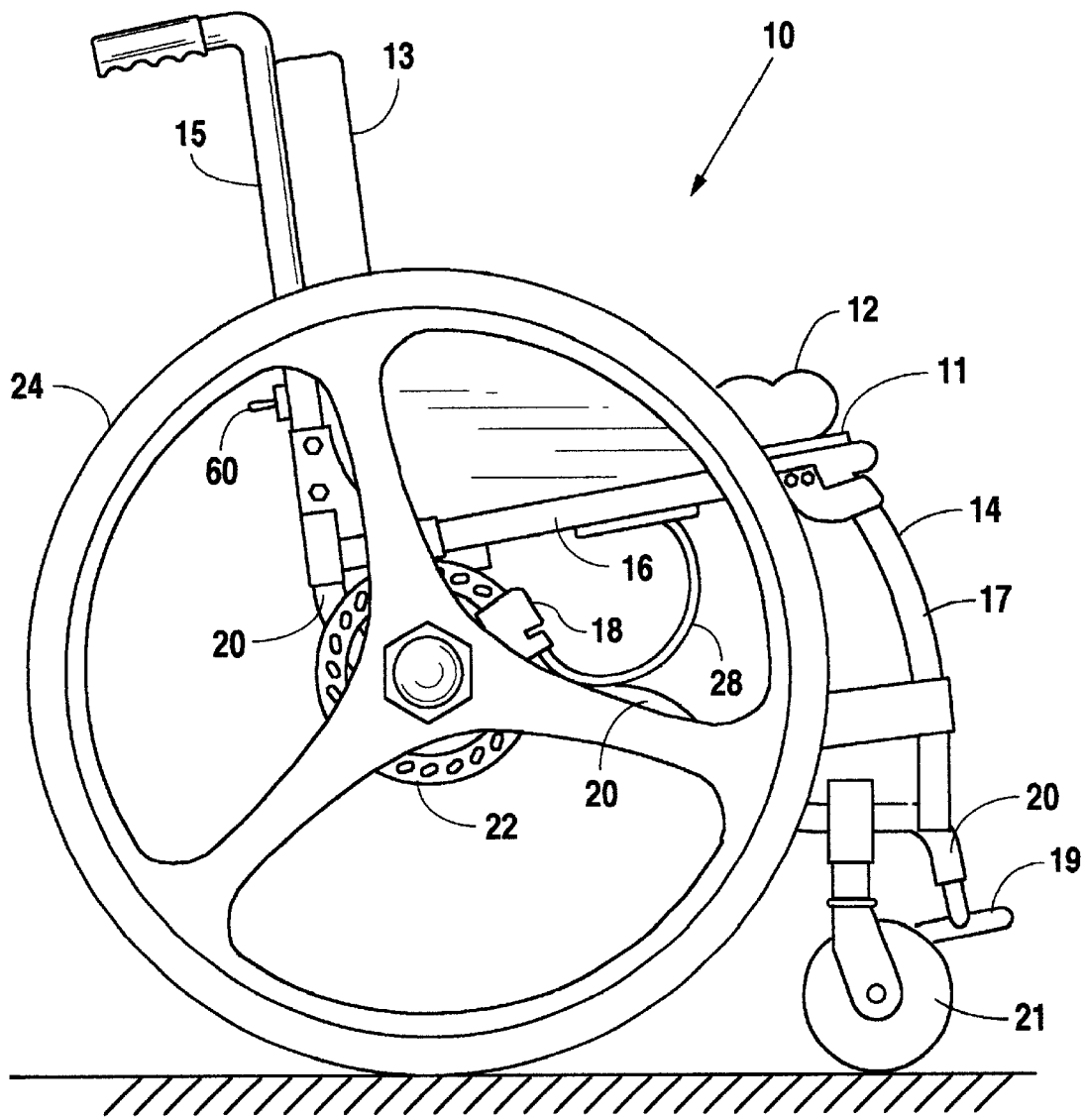
FIG. 1 is a elevational side view of a manual wheelchair depicting a caliper braking mechanism mounted to the wheelchair frame and positioned to clamp onto a metal disk mounted axially to the hub of the wheelchair wheel.

Referring to FIG. 1, a lightweight manual wheelchair 10 is equipped with a solid seat base 11, seat cushion 12, and seat back 13 mounted between first and second wheelchair wheels 24 generally to a frame 14. The frame 14 has a vertical component 15, a side horizontal component 16, a frontal curved component 17 and a lower curved component 20. A footrest 19 is mounted at the frontal extremity of the lower curved component 20 of the frame 14. First and second caster wheels 21 are pivotally mounted toward the frontal extremity of the lower curved component 20 of the frame 14. The manual wheelchair 10 is symmetrical about a centre line and the opposed side is identical to the side visible in FIG. 1. Thus, when the first and second of numbered items are referred to without the second item being shown, it can be appreciated that the second numbered item is identical to the first but on the opposite side of the wheelchair.

Figure 4:
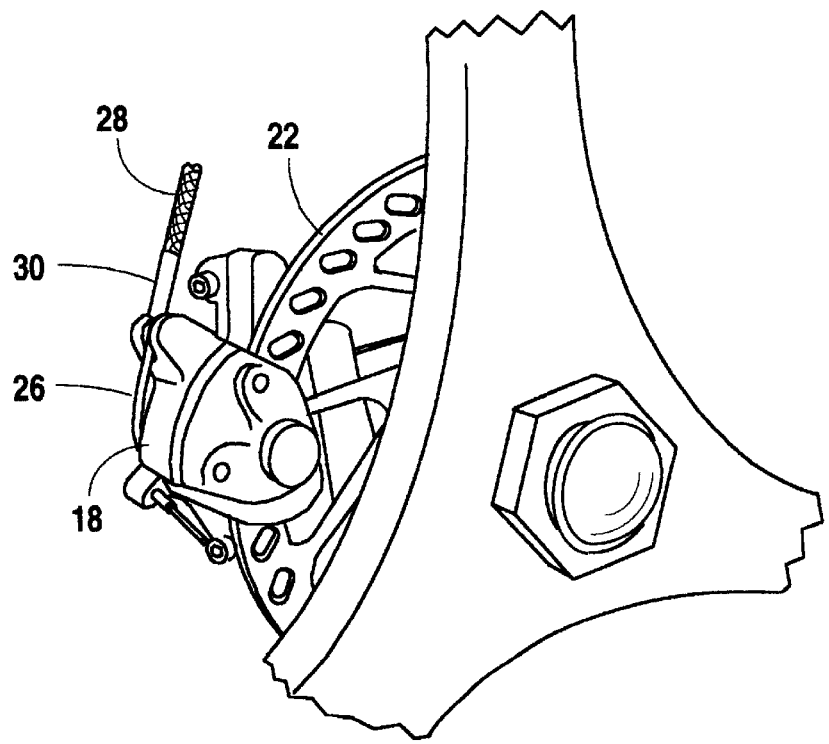
FIG. 4 is an enlarged perspective view depicting the caliper braking mechanism.

First and second caliper brakes 18 are mounted to extension plates (not shown) which are in turn mounted to the frame 14. The caliper brakes 18 are positioned to clamp onto first and second disks 22 (see FIGS. 1 and 4). In the preferred embodiment of this invention, the first and second caliper brakes 18 are manufactured by Hayes/HMX, model number BR3920. However, numerous other cable actuated caliper brakes are available on the market and can be used in this invention.

Figure 2A:
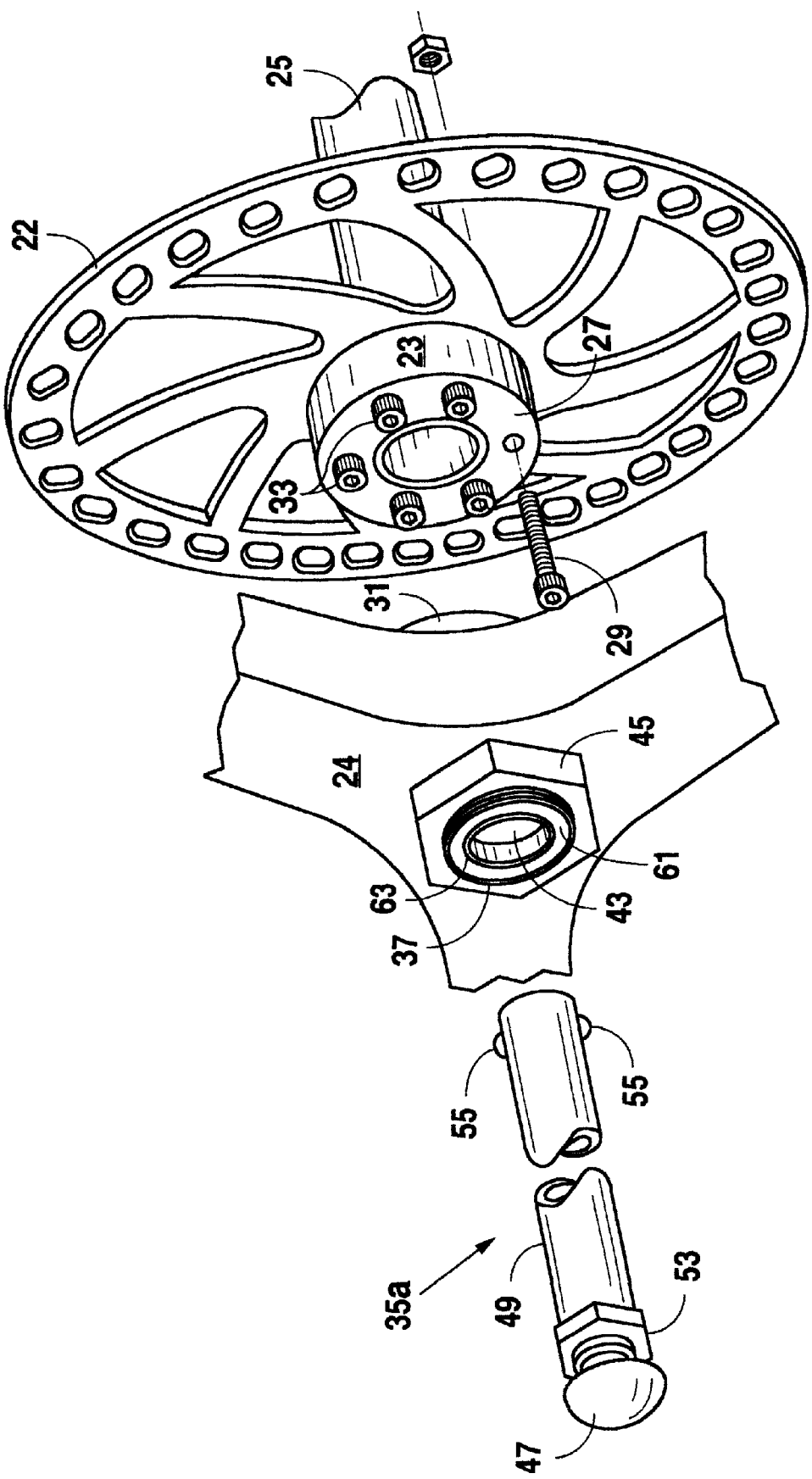
FIGS. 2A and 2B are enlarged exploded perspective views depicting the wheelchair wheel, hub and disk assembly.
Figure 2B:
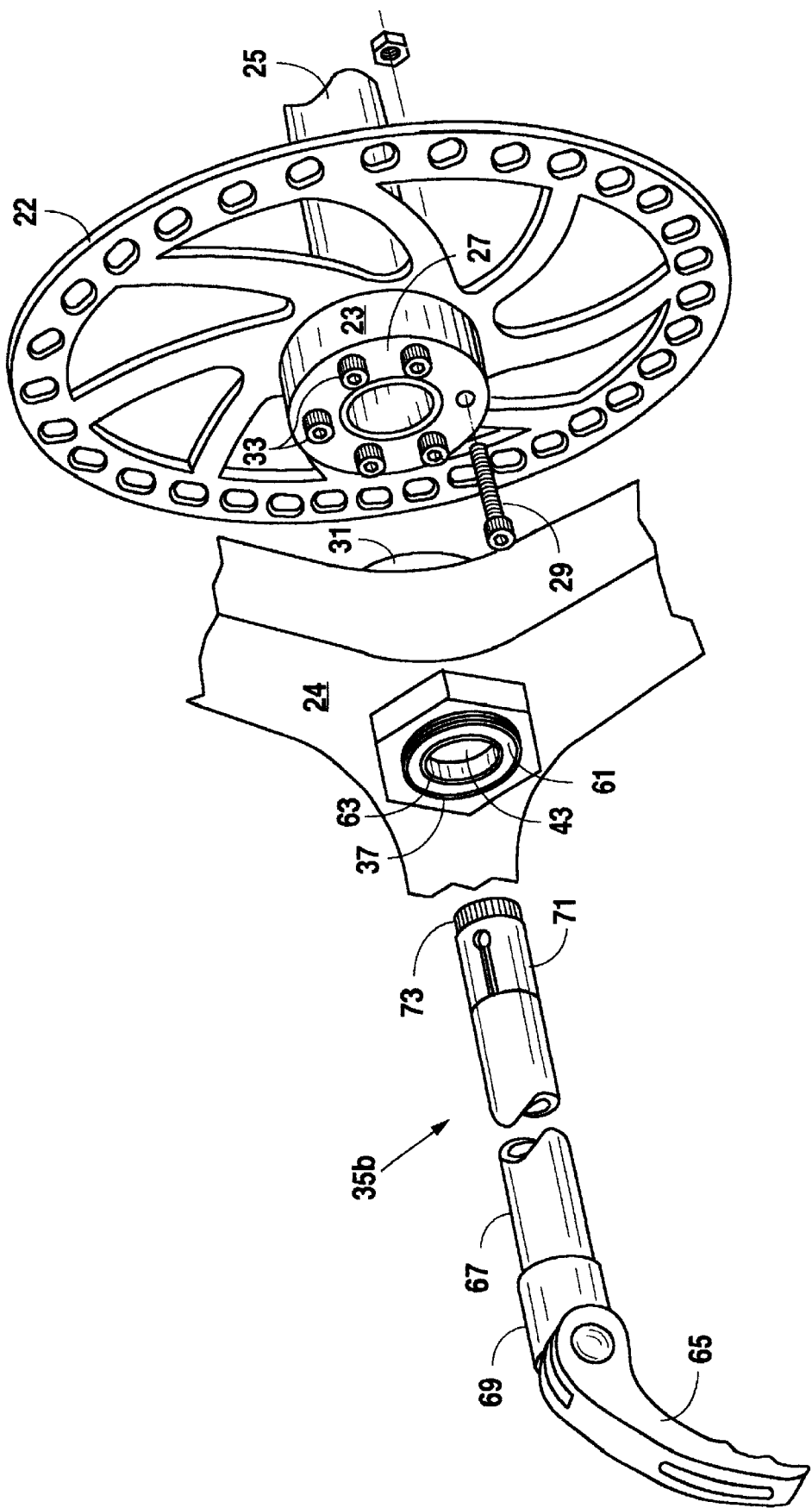

As shown in FIG. 2, the first and second wheelchair wheels 24 can be detached without removal of the first and second disks 22 or the first and second caliper brakes 18. The first and second disks 22 are concentrically mounted to first and second disk hubs 23 by means of a plurality of Allen screws 29 passing through radially spaced interiorly threaded, aligned holes in the first and second disk hub 23 and the first and second disks 22 are secured with nuts. The heads 33 of the Allen screws 29 extend from the outer vertical faces 27 of the first and second disk hubs 23. The first and second inner hubs 23 and disk 22 assemblies are concentrically mounted to opposite ends outer tubular axle 25 and rotate thereon. The tubular axle 25 is clamped to the first and second lower curved components 20 of the frame 14 at its rear extremity by first and second frame clamps 72.

The first and second wheelchair wheels 24 are concentrically mounted on the first and second wheel hubs 37. The inner surface (not shown) of the first and second wheelchair wheels 24 is mounted flush against the outer vertical surface (not shown) of the flanged inner portion 31 of the first and second wheel hubs 37 and are secured to the first and second wheel hubs 37 by first and second nuts 45, which screw onto exteriorly threaded outer ends (not shown) of the first and second wheel hubs 37. The first and second wheel hubs have a tubular opening 43 through their center. An outer circular bearing assembly 61 is pressed fit into the tubular opening 43 towards the outer end of the first and second wheel hubs 37. An inner circular bearing assembly (not shown) is pressed fit into the tubular opening 43 at the inner end of the first and second wheel hubs 37. The outer bearing assembly 61 and inner bearing assembly (not shown) have inner rings 63 which turn within the bearing assemblies. The inner diameter of the inner rings 63 is equal to the inner diameter of tubular axle 25. In the preferred embodiment, the outer circular bearing assembly 61 and inner circular bearing assembly (not shown) are manufactured by NICE, Model No. 1616 DC TN or KYK, Model No. R-8-DDHA1(IB). However, it is anticipated that other similar bearings could be used.

When first and second wheelchair wheels 24 are mounted to the wheelchair 10, the outer vertical faces 27 of the first and second inner hubs 23 mate with inner faces (not shown) of the flanged inner portion 31 of the first and second wheel hubs 37 such that the heads 33 of the plurality of Allen screws 29 fit snugly into a plurality of radially spaced circular holes (not shown) in the flanged inner portion 31 of the first and second wheel hubs 37. First or second locking pins 35a and 35b (see FIGS. 2A and 2B) extend axially through the center of the first and second wheel hubs 37, the first and second disk hubs 23, and into tubular axle 25, to hold the first and second disk hubs 23 and first and second wheel hubs 23 together. The mating of heads 33 into the space circular holes (not shown) cause the first and second wheelchair wheels 24 and the first and second disks 22 to rotate together. The first or second locking pins 35a and 35b have a diameter which allows the first or second locking pins 35a and 35b to slide through the inner rings 63 of the outer circular bearing assembly 61 and the inner circular bearing assembly (not shown) and into tubular axle 25 with minimal clearance.

The first and second wheelchair wheels 24 can be detached from the wheelchair 10 without removing the first and second disks 22 or disturbing the first and second caliper brakes 18 by removing the first and second locking pins 35a or 35b and separating the first and second wheel hubs 37 from the first and second disk hubs 23.

In one preferred embodiment of the invention (see FIG. 2A), the first and second locking pins 35a have a push button 47, a rod 49, an adjusting nut 53, and a set of retractable nipples 55. The push button 47 is spring biased in the released position, causing the retractable nipples 55 to extend from the rod 49. When the push button 47 is depressed, the retractable nipples 55 retract into the rod 49. The first and second locking pins 35a can be inserted through the inner ring 63 of the outer circular bearing assembly 61 and into the tubular openings 43 of the first and second wheel hubs 37 by depressing the push button 47 and thereby causing the retractable nipples 55 to retract. When the first and second locking pins 35a are inserted through the first and second wheel hubs 37 and into opposite outer ends of the tubular axle 25 and the push button 47 is released, the retractable nipples 49 extend into grooves (not shown) circumferentially cut into the interior surface (not shown) of the opposite outer ends of tubular axle 25. The grooves (not shown) are of sufficient depth and width to allow the retractable nipples 49 to extend into the grooves (not shown) with minimal clearance. The grooves (not shown) are positioned in tubular axle 25 to allow the retractable nipples 55 to extend into the first and second grooves (not shown) when the first and second locking pins 35 are fully inserted into the first and second wheel hubs 37 such that the adjustable nut 53 contacts the outer surface of the outer circular bearing assembly 61. In this preferred embodiment, the locking pin is a QRP Quick Release Push Button (large/small) Axle, Model No. 21QRP11CDASN.

In another preferred embodiment of the invention (see FIG. 2B), the first and second locking pins 35b have a release lever 65 at one end of a rod 67, a spacer joint 69 between the release lever 65 and the rod 67, an expandable tip 71 attached to the other end of the rod 67, a wedging cap 73 attached to the expandable tip 71 opposite the rod 67. When the release lever 65 is rotated to the released position so that it extends parallel with the rod 67, the diameter of the expandable tip 71 is not expanded and is equal to the diameter of the rod 67. When the release lever 65 is rotated perpendicular to the rod 67, the wedging cap 61 is pulled toward the release lever 65 causing the expandable tip 71 to expand to a diameter greater than the diameter of the rod 67. When the release lever 65 is in the released position, the first and second locking pins 35b can be inserted through the inner ring 63 of the outer circular bearing assembly 61 and into the tubular opening 43 of the first and second wheel hubs 37. When the first and second locking pins 35b are inserted through the first and second wheel hubs 37, and into the opposite outer ends of the tubular axle 25 and the release lever 65 is then rotated perpendicular to the rod 67, the expandable tip 71 expands into and makes frictional contact with the interior surface (not shown) of the opposite outer ends of the tubular axle 25. The frictional force created is great enough to hold the first and second locking pins 63 in place. The diameter of the spacer joint 69 is greater than the inner diameter of the inner ring 63 of the outer circular bearing assembly 61, such that when the first and second locking pins 35b are fully inserted, the spacer joint 69 contacts the outer face of the outer circular bearing assembly 61. In this preferred embodiment, the locking pin is the Ultra Axil, 0.50" O.D. manufactured by Rousson Chamoux.

Figure 5:
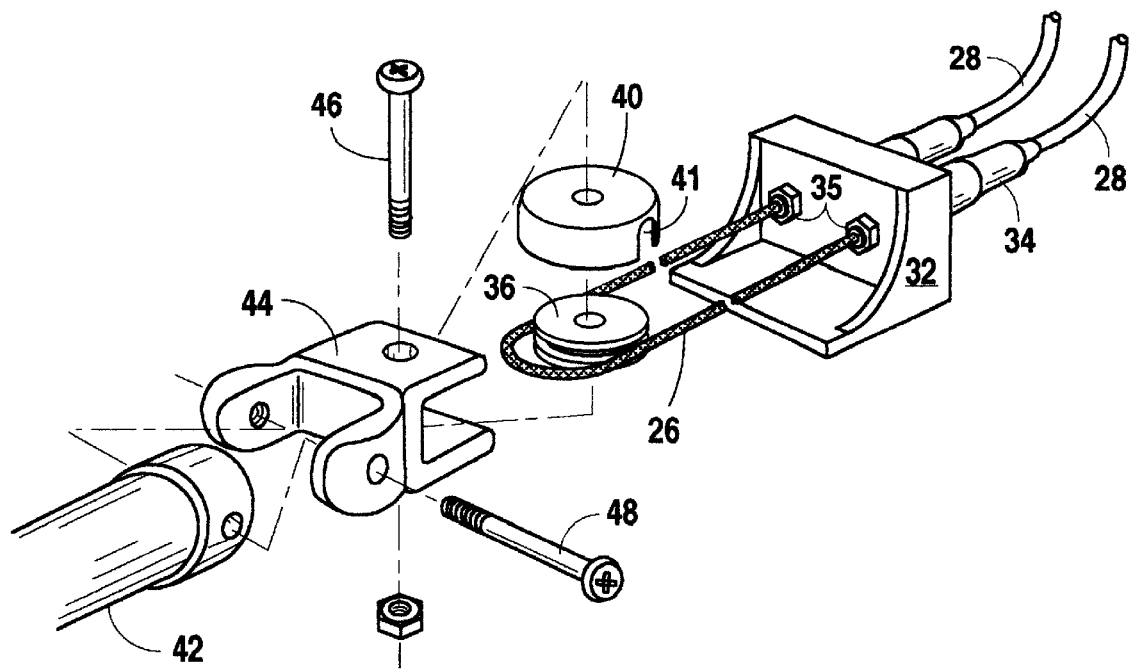
FIG. 5 is an exploded perspective view depicting the cable wire and pulley assembly and actuator rod mount.

The first and second caliper brakes 18 are activated by pulling a cable wire 26 (See FIGS. 4 and 5) attached to the caliper brakes 18 at first and second ends of the cable wire 26. The first and second ends of the cable wire 26 are directed to the first and second caliper brakes 18 through a cable wire housing 28 which is attached to a nozzle 30 on the first and second caliper brakes 18. The first and second ends of the cable wire 26 are attached to the first and second caliper brakes 18, respectively, in typical fashion. The cable wire 26 passes through the nozzle 30 of the first and second caliper brakes 18 and into the cable wire housing 28. The cable wire housing 28 directs the cable wire 26 to a mounting bracket 32 (See FIG. 5). The mounting bracket 32 has a vertical portion, and an upper horizontal portion. The mounting bracket 32 is mounted to the bottom of the solid seat base 11 by two screws (not shown) passing through interiorly threaded aligned holes in the solid seat base 11 and upper horizontal portion of the mounting bracket 32.

The cable wire housing 28 is connected to the mounting bracket 32 by means of first and second hollow connectors 34. The first ends of the first and second hollow connectors 34 fit snugly within first and second circular openings (not shown) in the mounting bracket 32 and the second ends of the first and second hollow connectors 34 fit snugly around the cable wire housing 28. The centers of said first and second circular openings (not shown) are equidistant from the upper horizontal portion of the mounting bracket 32 and are horizontally spaced a distance equal to the diameter of the pulley 36. The diameter of the first and second circular openings (not shown) is sufficient to allow the first and second hollow connectors 34 to fit snugly and the cable wire 26 to pass through first and second circular openings (not shown) within the first and second hollow connectors 34. The cable wire 26 passes through the circular openings in the mounting bracket 32 within the first and second hollow connectors 34 and then passes around the pulley 36.

The pulley 36 and cable wire 26 assembly is covered with a circular pulley cap 40. The inner diameter of the circular pulley cap 40 is of sufficient dimension to cover the pulley 36 and wire cable 26 assembly with minimal clearance. The vertical side of the pulley cap 40 has first and second openings 41 spaced to allow the cable wire 26 to pass into the pulley cap 40 and around the pulley 36. In the preferred embodiment of this invention, the segments of the cable wire 26 on opposite sides of the pulley 36 between the pulley 36 and mounting bracket 32 are parallel. Both segments of the cable wire 26 are perpendicular to the vertical side of the mounting bracket 32.

The pulley cap 40, pulley 36, and wire cable 26 are connected to an actuator rod 42 of a DC linear actuator 50 (See FIG. 3) by means of a coupling bracket 44. The pulley cap 40, pulley 36, and wire cable 26 are connected to the coupling bracket 44 by a bolt and nut combination 46 passing through holes vertically aligned with the axis of the pulley cap 40 and pulley 36. The actuator rod 42 is connected to the coupling bracket 44 by a bolt and nut combination 48 passing through holes horizontally aligned through the coupling bracket 44 and through the center of the outer end of the actuator rod 42.

Figure 3:
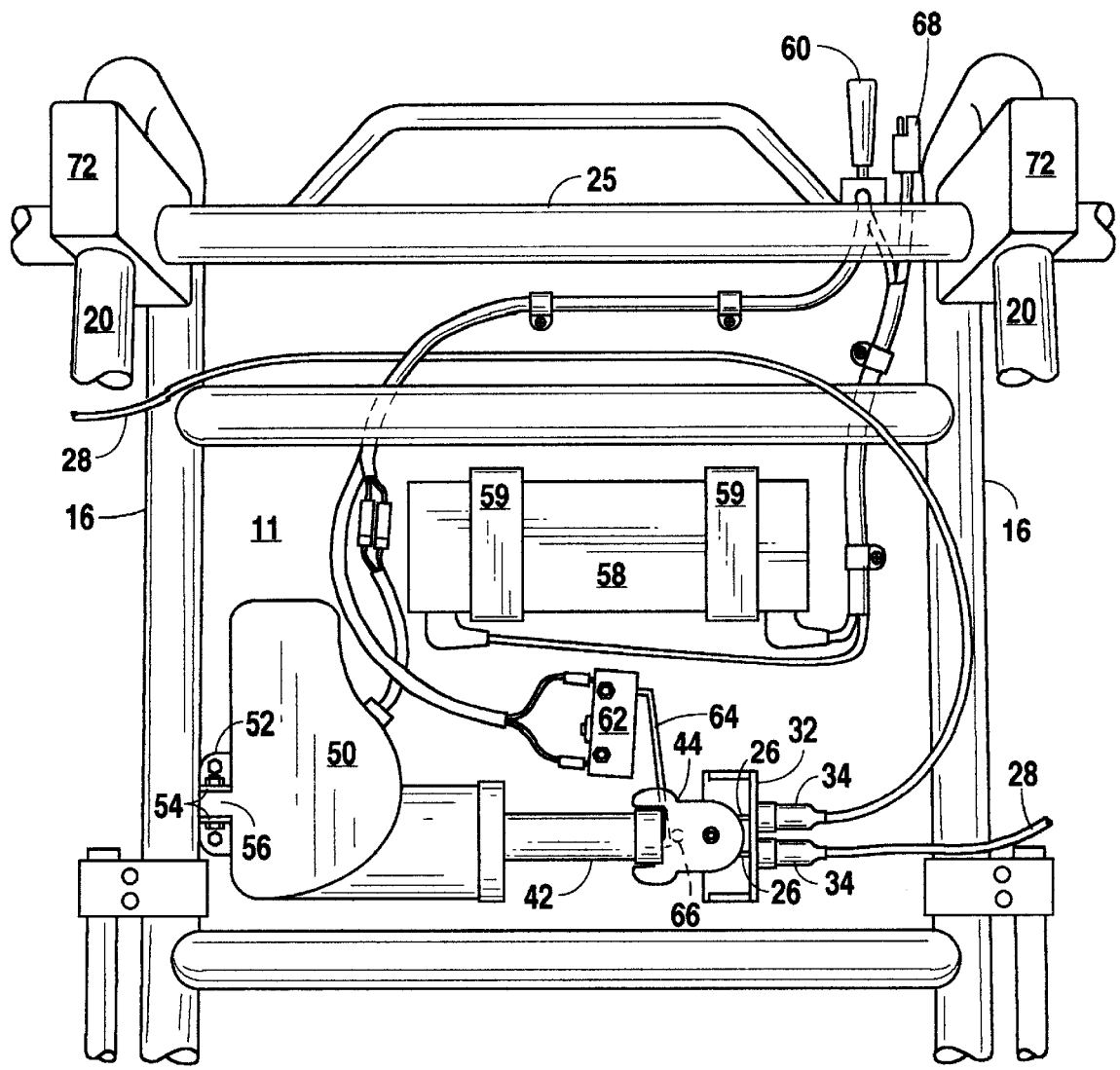
FIG. 3 is a bottom view of the wheelchair seat depicting the toggle switch, the battery recharging outlet, the electrical wiring, the twelve-volt rechargeable battery, the DC linear actuator, the cable wire and pulley assembly, and the motion limit switch.

The DC linear actuator 50, as shown in FIG. 3, is mounted to the solid seat base 11 by means of a mounting flange 56 and an actuator mounting piece 52. The actuator mounting piece 52 is mounted to the solid seat base 11 by two nut and bolt combinations. The mounting flange 56 is mounted to the actuator mounting piece 52 by a nut and bolt combination passing through horizontally aligned holes in the mounting flange 56 and first and second vertical portions 54 of the actuator mounting piece 52. The DC linear actuator is positioned so that displacement of the actuator rod 42 is in a direction perpendicular to the vertical portion of the mounting bracket 32 and centered between the first and second circular openings (not shown) in the vertical portion of the mounting bracket 32. In the preferred embodiment, the DC linear actuator 50 is manufactured by Warner Electric, model number DE12Q17W41-02FHM3HN.

The DC linear actuator 50 is powered by a twelve-volt rechargeable battery 58 mounted to the bottom of the solid seat base 11. In the preferred embodiment of this invention, the twelve volt rechargeable battery 58 is mounted to the solid seat base 11 by first and second Velcro straps 59. Each of the first and second Velcro straps 59 pass through two slits (not shown) in the solid seat base 11 such that each of the first and second Velcro straps 59 pass through the first slit (not shown) to the top of the solid seat base 11 and back through the second slit (not shown) and around the twelve volt rechargeable battery 58. In the preferred embodiment of this invention, the twelve volt rechargeable battery 58 is a sealed, non-spillable, lead battery manufactured by CSB Battery Company, Ltd.

A recharger outlet 68 is mounted to the frame 14 and is wired across the positive and negative leads of the twelve volt rechargeable battery 58. In the preferred embodiment of this invention, the recharger outlet 68 is mounted to the rear of the solid seat base 11. However, the recharger outlet 68 can be mounted generally to any part of the frame 14 where is it convenient and accessible.

Figure 6:
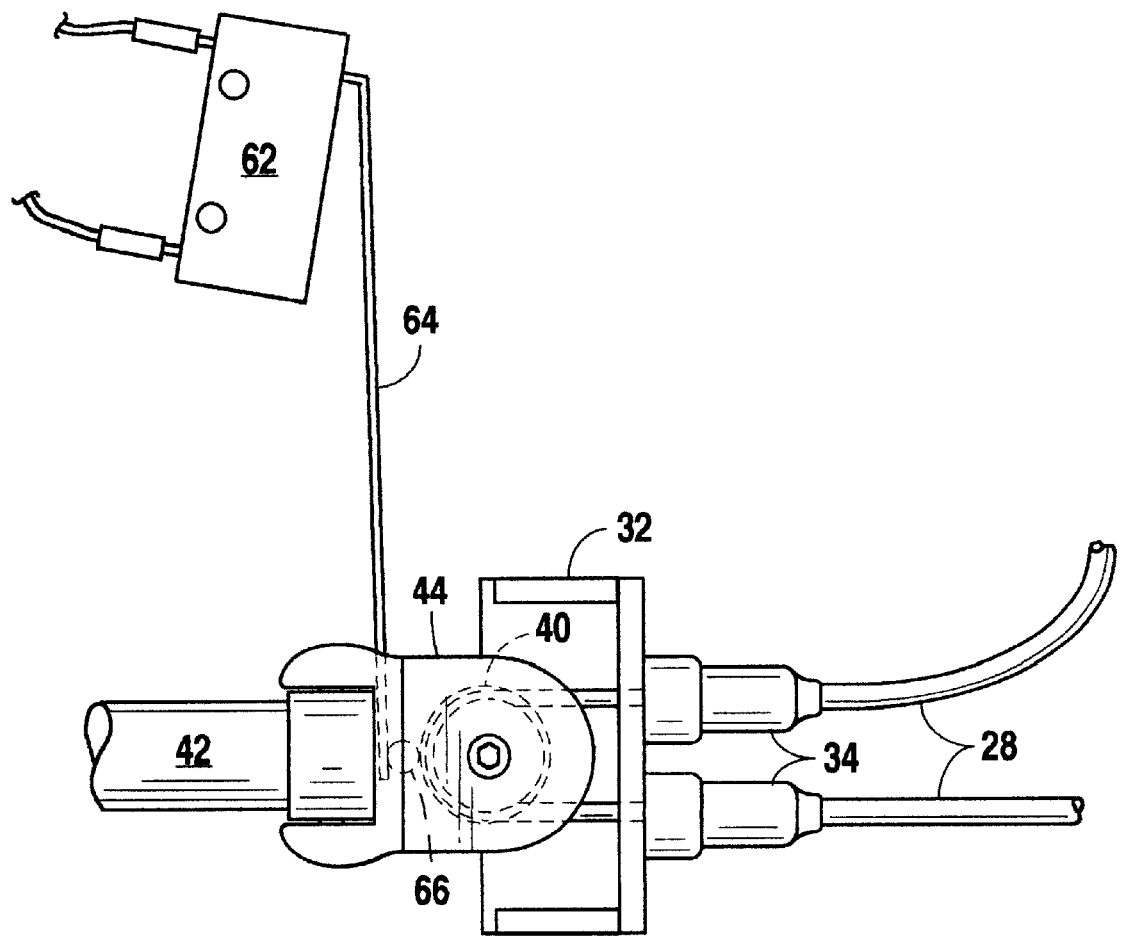
FIG. 6 is a bottom view of the cable wire, pulley, and actuator rod assembly brackets and the motion limit switch.
Figure 7:
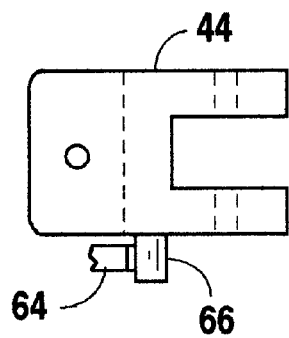
FIG. 7 is a elevational side view of the coupling bracket.
Figure 8:
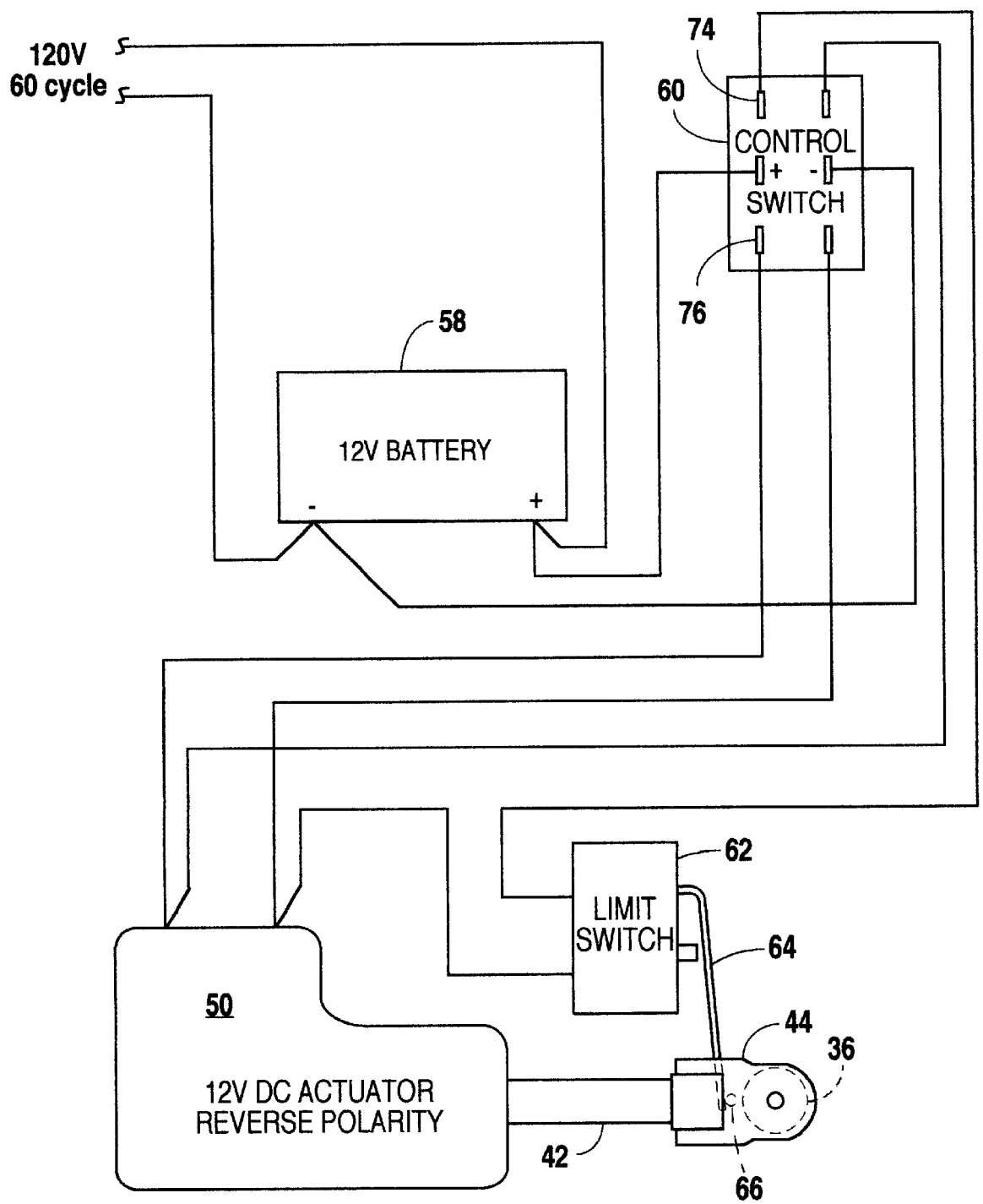
FIG. 8 is an electrical circuit diagram illustrating the electrical control circuit of this invention.

As shown in FIGS. 3 and 8, the battery power is controlled by a double throw toggle switch 60 which is mounted to the frame 14. In the preferred embodiment of this invention, the double throw toggle switch 60 is mounted to vertical component 15 of the frame 14. (See FIG. 1.) However, the double throw toggle switch 60 can be mounted generally to any part of the frame 14 where it is convenient and accessible to the wheelchair user. The double throw toggle switch 60 is wired into the electrical circuit, as shown in FIG. 7, across the positive and negative leads of the twelve volt rechargeable batter 58. The double throw toggle switch 60 can be thrown in a first direction 74 or a second direction 76. If the double throw toggle switch 60 is thrown in the first direction 74, it closes the circuit and powers the motion of DC linear actuator 50 and causes the actuator rod 42 to retract. The retraction of the actuator rod 42 pulls the pulley 36 and cable wire 26 assembly causing the displacement of the cable wire 26 within the cable wire housing 28 in a direction away from the first and second caliper brakes 18 (See FIGS. 4, 5, and 6 in combination). The displacement of the cable wire 26 away from the first and second caliper brakes 18 causes equal tension in the cable wire 26 on opposite sides of the pulley 36 and activates the first and second caliper brakes 18 with equal braking force.

If the double throw toggle switch 60 is thrown in the second direction 76, it closes the circuit and the polarity and direction of current flow through the DC linear actuator 50 is reversed. This powers the motor of the DC linear actuator 50 in the reverse direction and causes the actuator rod 42 to extend. The extension of the actuator rod 42 displaces the pulley 36 and causes the cable wire 26 to move within the cable wire housing 28 toward the first and second caliper brakes 18. This in turn releases the tension in the cable wire 26 created by retracting the activator rod and deactivates the first and second caliper brakes 18. The first and second caliper brakes 18 are spring biased (not shown) toward the deactivated position which retains tension in the cable wire 26 while the actuator rod 42 is extending and prevents bunching of the cable wire 26.

In order to control the tension in the cable wire 26 when the actuator rod 42 is retracting, a motion limit switch 62 is placed in the electrical circuit, as shown in FIG. 7, between the positive lead of double throw toggle switch 60. When the double throw toggle switch 60 is thrown in the first direction 74, the motion limit switch 62 limits movement of the DC linear actuator 50. The motion limit switch 62 is equipped with a motion arm 64 as shown in FIGS. 3, 6, 7, and 8. The motion arm 64 is spring biased to contact and press against an actuating pin 66 as shown in FIGS. 3, 6, 7, and 8. The actuating pin 66 extends from, and is a part of, the coupling bracket 44 as more clearly illustrated in FIG. 6. The motion limit switch 62 is normally closed. Retraction of the actuator rod 42 causes displacement of the coupling bracket 44 and actuating pin 66, which in turn displaces the motion arm 64. Sufficient displacement of the motion arm 64 throws the motion limit switch 62 opening the circuit and preventing further retraction of the actuator rod 42. The displacement of the motion arm 64 required to throw the motion limit switch 62 is adjustable to allow for control and selection of the tension in the cable wire 26 and the resulting braking force.

In the normal operation of the wheelchair 10, it is desirable to have brakes activated during the transfer in and out of the wheelchair 10. If the wheelchair user intends to transfer out of the wheelchair, he will throw the toggle switch 60 in the first direction 74 which causes the actuator rod 42 to retract and activates the first and second caliper brakes 18. The wheelchair user should hold the toggle switch 60 in the first direction 74, thereby increasing the braking force applied by the first and second caliper brakes 18 until the motion limit switch 62 is thrown and opens the circuit which stops the retraction of the actuator rod 42. The user should then release the toggle switch 60 which is spring biased to the center, OFF position. The motor of the DC linear actuator 50 locks the actuator rod 42 in position when there is no power to the DC linear actuator 50. Thus, the first and second caliper brakes 18 will remain activated and hold the wheelchair 10 in position while the wheelchair user transfers out of the chair. The first and second caliper brakes 18 will remain activated until the toggle switch 60 is thrown and held in the second direction 76 and thereby allowing the actuator rod 42 to extend a sufficient amount to deactivate the first and second caliper brakes 18 and allow the first and second wheelchair wheels 24 to rotate freely. The toggle switch 60 is then released allowing it to spring back to the center OFF position which opens the circuit and stops the flow of power to the DC linear actuator 50.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A lightweight manual wheelchair having an electrical braking system for use by an individual with a disability, said electrical braking system being connectable to an external source of power, said lightweight manual wheelchair comprising:

a lightweight frame;

a seat having a bottom portion and back portion mounted within said frame;

hand operated wheels rotatably mounted on said frame for rotation by said individual;

caliper type brake on each of said hand operated wheels;

braking cable connectable from said caliper type brakes to an electrical actuator mounted on said lightweight frame;

electrical storage device mounted on said lightweight frame for providing power to said electrical actuator;

pulley connecting said braking cable and said electrical actuator to provide substantially equal force on each of said caliper type brakes; and switch between said electrical storage device and said electrical actuator for (a) moving said electrical actuator a first direction to apply braking force by said caliper type brakes, (b) moving said electrical actuator a second direction to remove said braking force of said caliper type brakes and, (c) removing said power from said electrical actuator to maintain said braking force of said caliper type brakes when said power is removed.

2. The lightweight manual wheelchair having an electrical braking system for a lightweight manual wheelchair as recited in claim 1 wherein said electrical actuator is a D.C. motor with an actuator rod that will remain in position when said power is removed.

3. The lightweight manual wheelchair having an electrical braking system as recited in claim 2 wherein opposite ends of said braking cable connect to said caliper type brakes on each of said hand operated wheels, a center portion of said braking cable extending through a mounting bracket, around said pulley, and back through said mounting bracket.

4. The lightweight manual wheelchair having an electrical braking system as recited in claim 3 wherein said braking cable includes a first cable housing extending between a first of said caliper type brake and said mounting bracket and a second cable housing extending between a second of said caliper type brake and said mounting bracket.

5. The lightweight manual wheelchair having an electrical braking system as recited in claim 1 further including a recharger outlet from said electrical storage device for periodic recharging of said electrical storage device from said external source of power.

6. The lightweight manual wheelchair having an electrical braking system as recited in claim 5 wherein said caliper type brakes are disk brakes positioned to exert braking force on a disk adjacent each of said hand operated wheels and rotated therewith.

7. The lightweight manual wheelchair having an electrical braking system as recited in claim 6 wherein each of said hand operated wheels are detachable from said disks and caliper type brakes.

8. The lightweight manual wheelchair having an electrical braking system as recited in claim 7 wherein each of said disks are mounted on a disk hub and each of said hand operated wheels are mounted on a wheel hub, each of said disk hubs are attachable to and detachable from each of said wheel hubs and rotatable therewith.

9. The lightweight manual wheelchair having an electrical braking system as recited in claim 8 wherein each of said disk hubs have a plurality of projections extending from the outer vertical surface of said disk hub and each of said wheel hubs having a plurality of openings in the inner vertical surface of said wheel hub, each of said projections extending from said disk hub being insertable into the corresponding said openings in said wheel hubs.

10. The lightweight manual wheelchair having an electrical braking system as recited in claim 2 further including a limit switch for limiting said moving of said electrical actuator in said first direction and hence said braking force.

11. The lightweight manual wheelchair having an electrical braking system as recited in claim 1 wherein said electrical actuator is a linear DC motor with an actuator rod that extends or retracts depending on polarity of said power applied thereto.

12. The lightweight manual wheelchair having an electrical braking system as recited in claim 11 further including a mounting bracket mounted on said frame for receiving said braking cable therethrough, a coupling bracket on a end of said actuator rod, said coupling bracket pivotally carrying said pulley therein.

13. An electrical braking system adaptable to a manual wheelchair, said electrical braking system being connectable to a external power source, said electrical braking system comprising:

caliper type brakes mountable to said manual wheelchair for providing braking force to said manual wheelchair's hand operated wheels;

braking cable connectable from said caliper type brakes to an electrical actuator mountable to said manual wheelchair;

electrical storage device mountable to said manual wheelchair's frame for providing power to said electrical actuator;

pulley connecting said braking cable and said electrical actuator to provide substantially equal force on each of said caliper type brakes; and switch between said electrical storage device and said electrical actuator for (a) moving said electrical actuator a first direction to apply a braking force by said caliper type brakes, (b) moving said electrical actuator a second direction to remove said braking force of said caliper type brakes, and (c) removing said power from said electrical actuator to maintain said braking force of said caliper type brakes when said power is removed.

14. The electrical braking system as recited in claim 13 wherein said electrical actuator is a DC motor with an actuator rod that will remain in position when said power is removed.

15. The electrical braking system as recited in claim 14 wherein opposite ends of said braking cable connect to said caliper type brakes, a center portion of said braking cable extending through a mounting bracket mountable to said manual wheelchair, around said pulley, and back through said mounting bracket.

16. The electrical braking system as citing in claim 15 wherein said braking cable includes a first cable housing extending between a first of said caliper type brake and said mounting bracket and a second cable housing extending between a second of said caliper type brake and said mounting bracket.

17. The electrical braking system as recited in claim 13 further including a recharger outlet from said electrical storage device for periodic recharging of said electrical storage device from said external source of power, said recharger outlet mountable on said manual wheelchair.

18. The electrical braking system as recited in claim 17 wherein said caliper type brakes are disk brakes positioned to exert braking force on a disk mountable to said hand operated wheels of said wheelchair and rotatable therewith.

19. The electrical braking system as recited in claim 14 further including a limit switch for limiting said moving of said electrical actuator in said first direction and hence said braking force.

20. The electrical braking system as recited in claim 13 wherein said electrical actuator is a DC linear motor with an actuator rod that extends or retracts depending on polarity of said power applied thereto.

21. The electrical braking system as recited in claim 20 further including a mounting bracket mountable on said wheelchair for receiving said braking cable therethrough, a coupling bracket on an end of said actuator rod, said coupling bracket pivotally carrying said pulley therein.

* * * * *